United States Patent [19]

Seifried et al.

[11] 4,246,433
[45] Jan. 20, 1981

[54] SQUARE GLASS FURNACE WITH SIDEWALL ELECTRODES

[75] Inventors: George B. Seifried; William R. Steitz, both of Toledo, Ohio

[73] Assignee: Toledo Engineering Co., Inc., Toledo, Ohio

[21] Appl. No.: 52,395

[22] Filed: Jun. 27, 1979

[51] Int. Cl.³ .................................................. C03B 5/02
[52] U.S. Cl. .............................................. 13/6; 13/23
[58] Field of Search ........................................ 13/6, 23

[56] References Cited

U.S. PATENT DOCUMENTS

| | | | |
|---|---|---|---|
| 3,440,321 | 4/1969 | Gell et al. | 13/6 |
| 3,506,769 | 4/1970 | Gell | 13/6 |
| 3,742,111 | 6/1973 | Pieper | 13/6 |

*Primary Examiner*—Roy N. Envall, Jr.
*Attorney, Agent, or Firm*—Hugh Adam Kirk

[57] ABSTRACT

An electric furnace having four equal length and height sidewalls at right angles to each other, and a bottom with an outlet trough under the center of one of said sidewalls. All of the rod electrodes for this furnace project horizontally inwardly from corner areas of the sidewalls usually perpendicularly to each sidewall equally spaced from the corner, but they may be angled less than about 20° toward the corner. For shallow furnaces having relatively low sidewalls only one or two electrodes at each corner area are required, all of which electrodes are located in the same horizontal plane. However, for deeper furnaces, two or more parallel horizontal planes of electrodes are provided which planes are equally vertically spaced less than the distance of the top electrode to the top of the furnace and the bottom electrode to the bottom of the furnace. Each of the electrodes are mounted in insulation blocks which extend inwardly from the inner surface of the furnace and surround each electrode. The current supply to this furnace is a two-phased current in which the phases are 90° apart and may be adapted from a three-phase current by a Scott transformer connection. All of the electrodes at two opposite corner areas are connected to one of the two phases, while all of the electrodes at the other two opposite corner areas of the furnace are connected to the other phase. The outside of the furnace is preferably provided with an insulation layer except on those portions of the wall adjacent the electrodes away from each corner, which portions are hottest and preferably cooled by an air blast.

6 Claims, 8 Drawing Figures

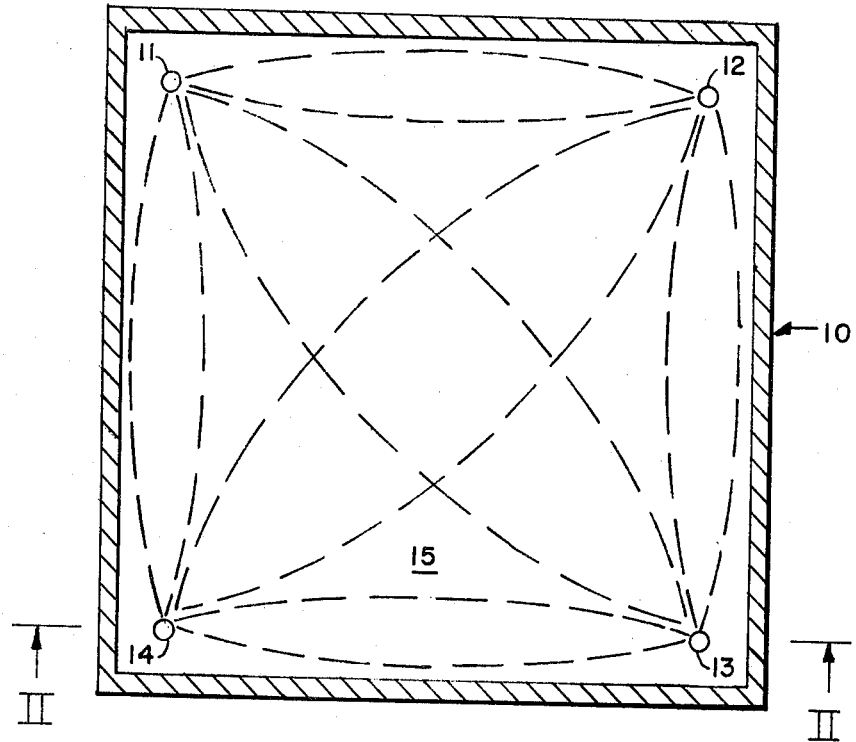
FIG. I (PRIOR ART)
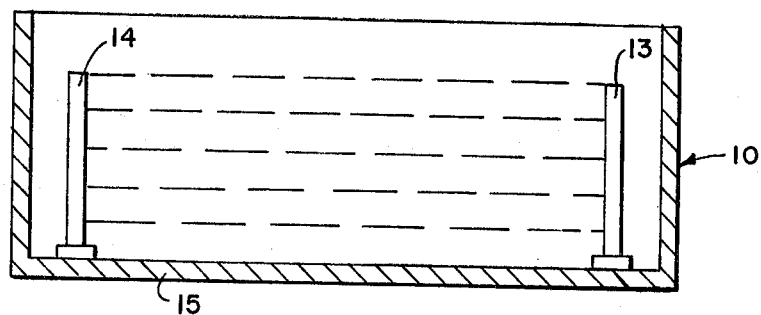
FIG. II (PRIOR ART)
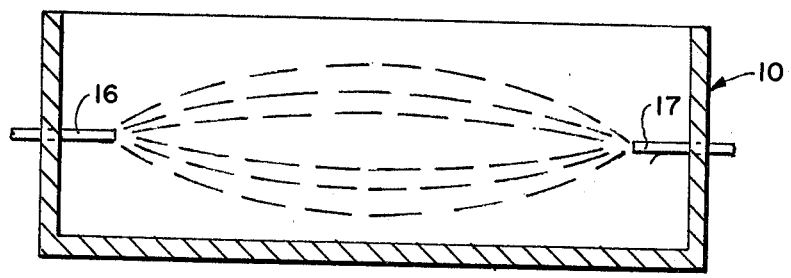
FIG. III (PRIOR ART)

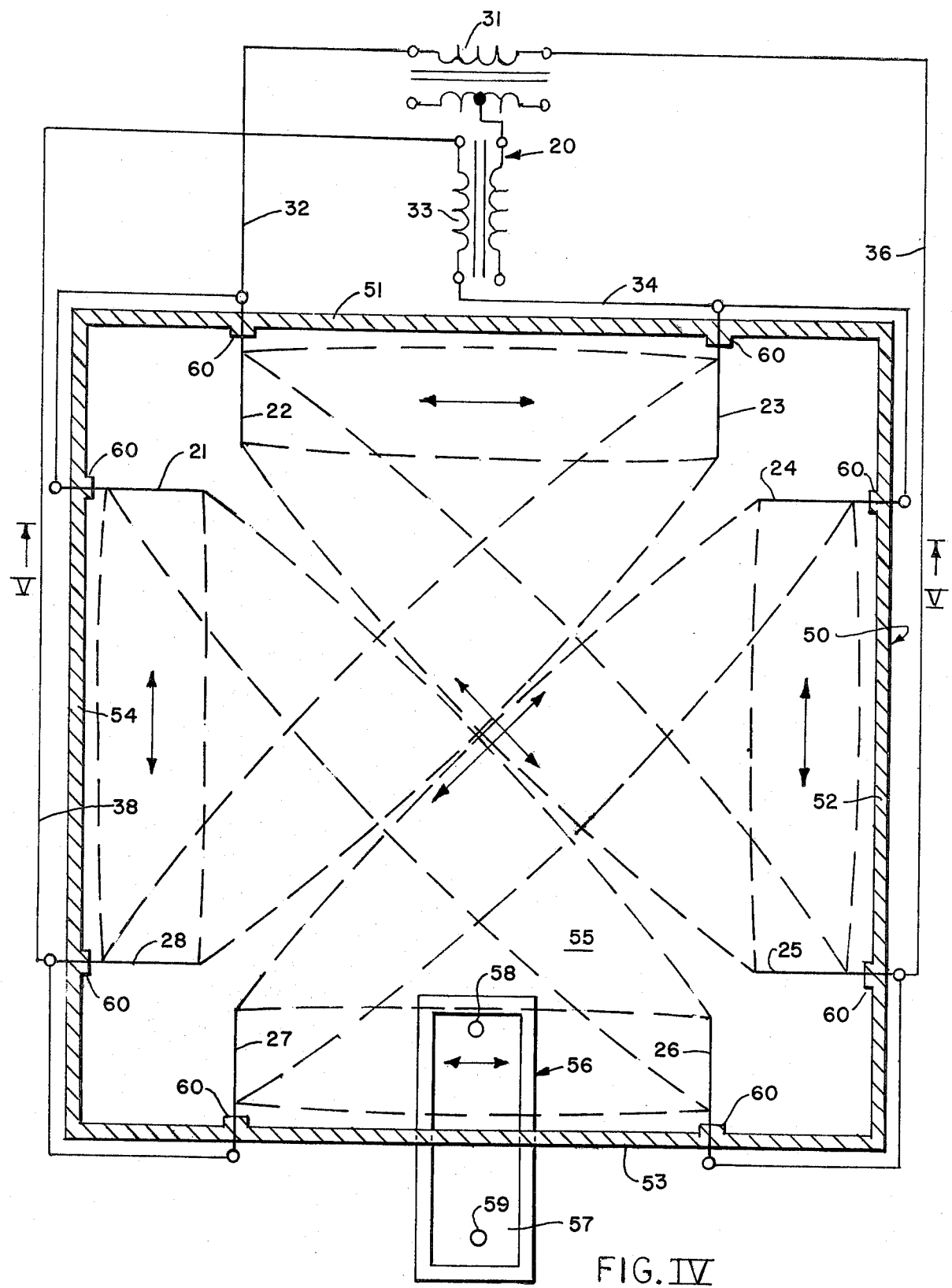
FIG. IV

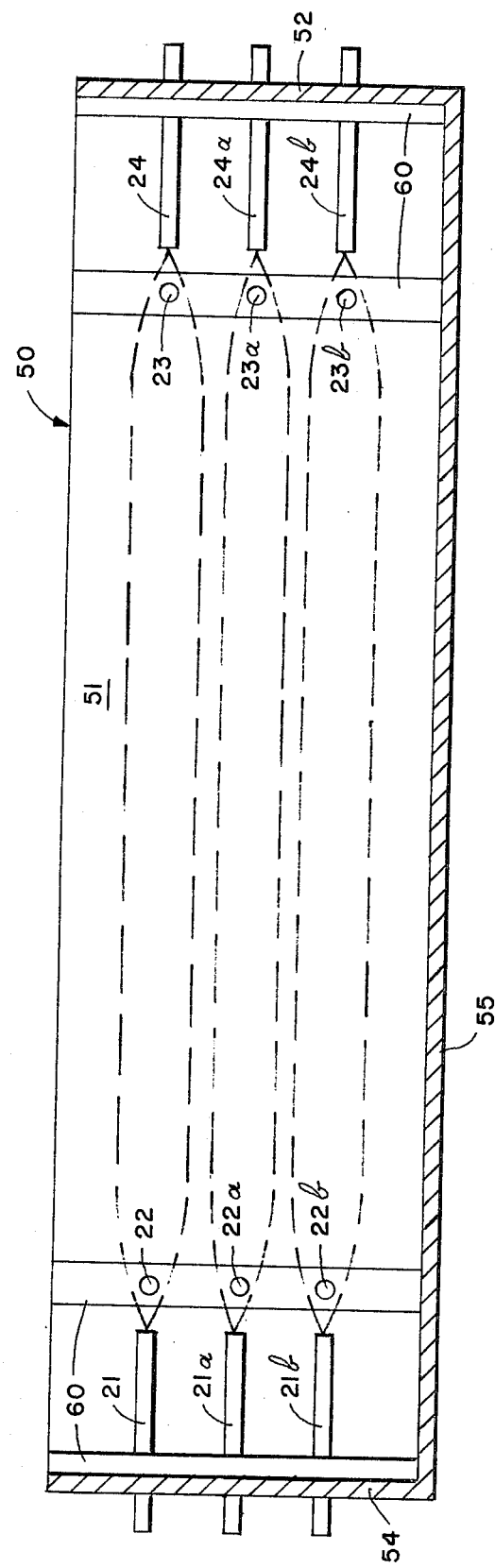
FIG. V

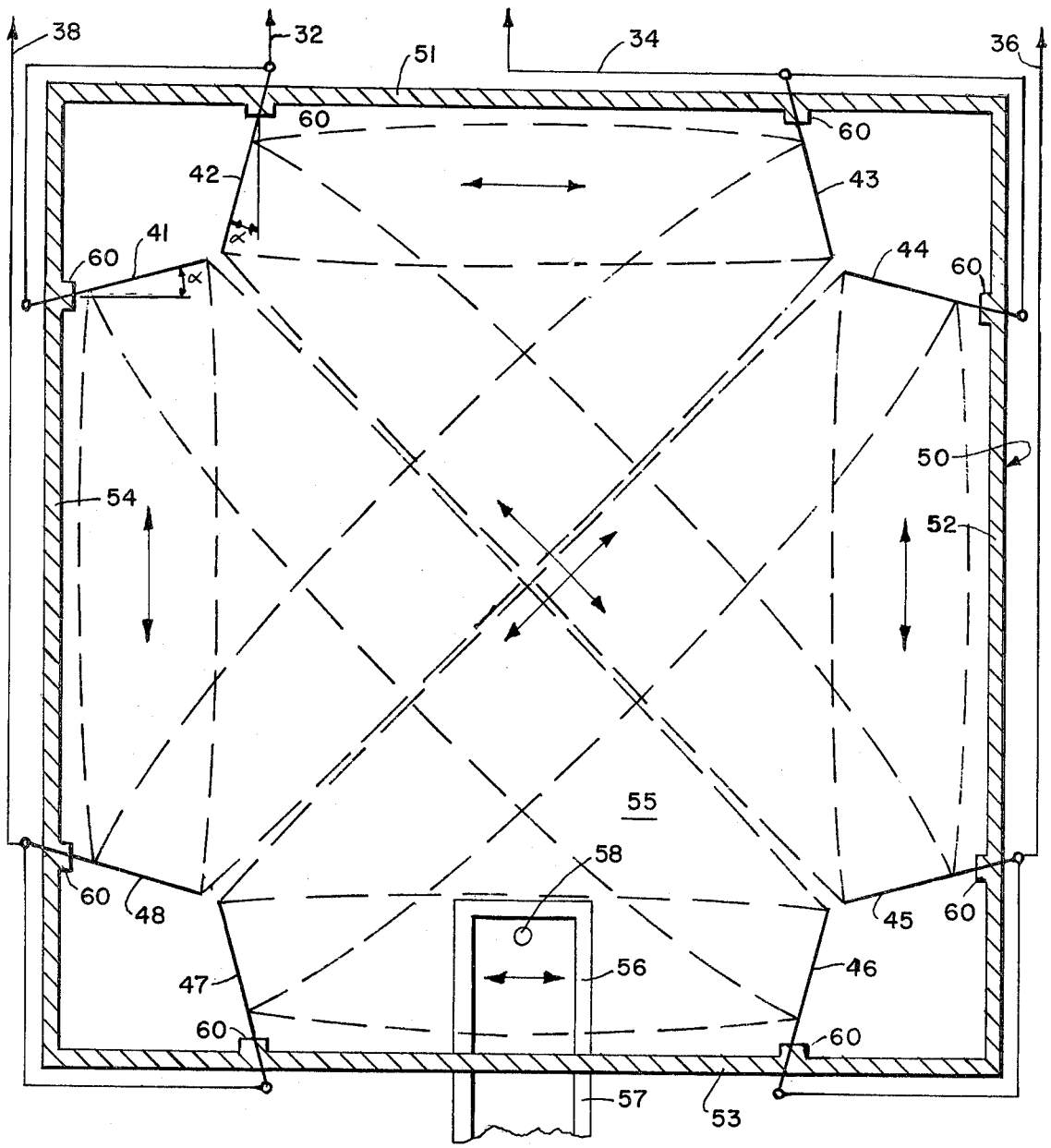
FIG VI

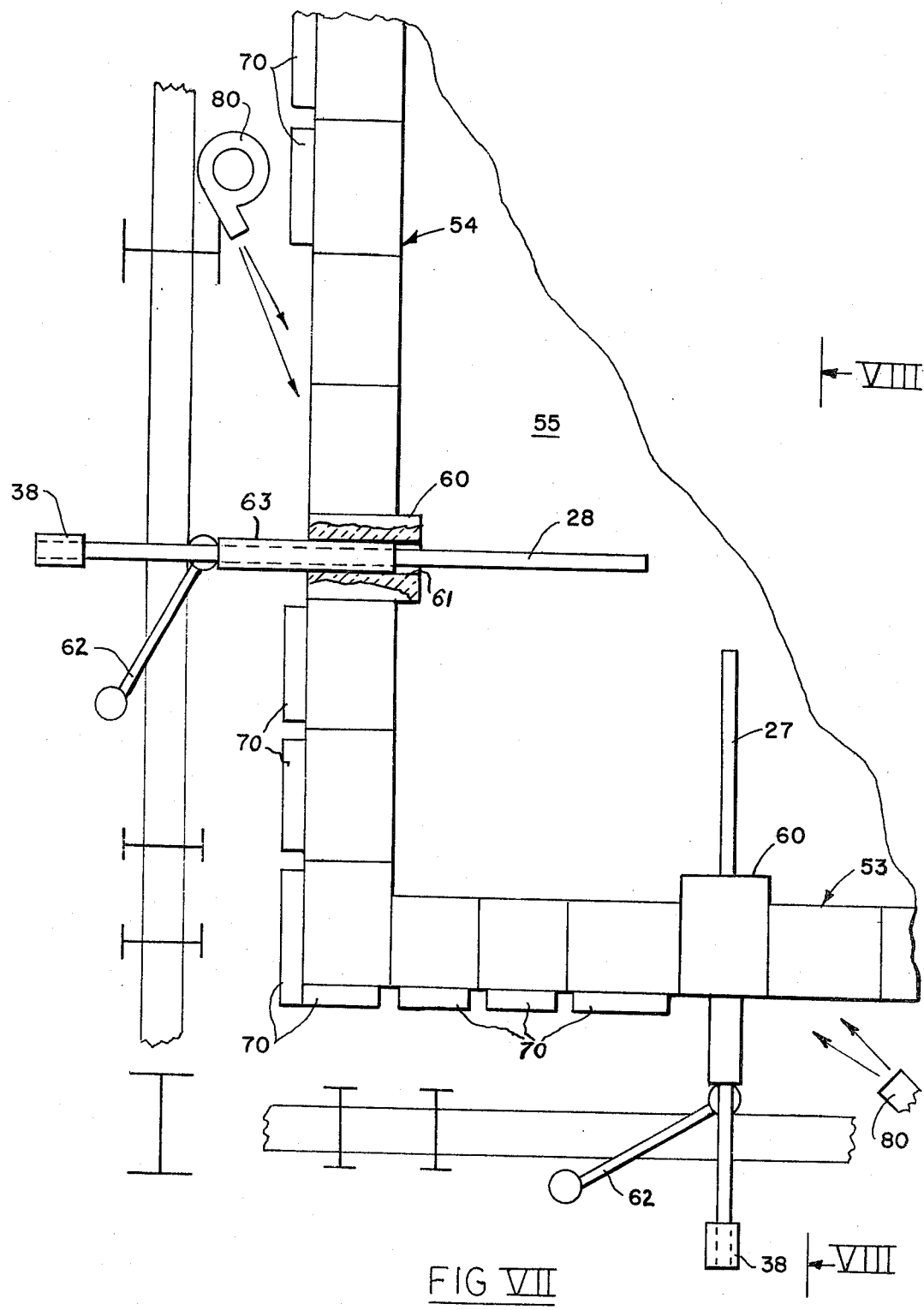
FIG VII

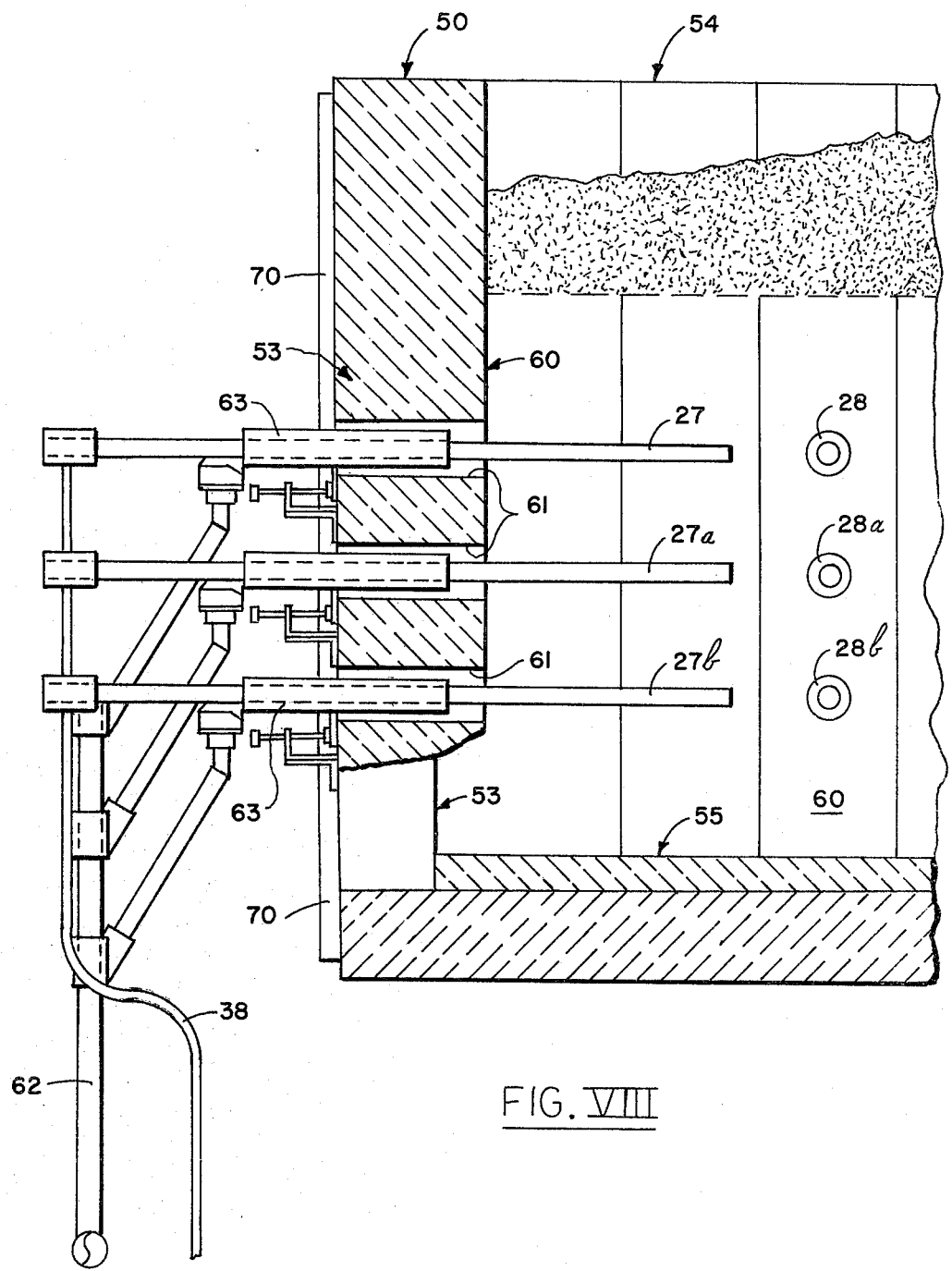
FIG. VIII

SQUARE GLASS FURNACE WITH SIDEWALL ELECTRODES

BACKGROUND OF THE INVENTION

The furnace of this invention is an improvement in Gell et al U.S. Pat. No. 3,440,321 issued Apr. 22, 1969 and assigned to the same assignee as the present application. The improvement comprises adapting the circuitry of this patent to sidewall electrodes.

Vertically and horizontally spaced rod electrodes in the sidewalls of electric furnaces, even in square electric furnaces, are shown in the Doolittle U.S. Pat. No. 656,600 issued Aug. 21, 1900, and in Horry U.S. Pat. No. 757,618 issued Apr. 19, 1904 and U.S. Pat. No. 771,250 issued Oct. 4, 1904, and Penberthy U.S. Pat. No. 2,749,378 issued June 5, 1956. However, all these patents disclose furnaces which operate on three or more phase currents.

SUMMARY OF THE INVENTION

Generally speaking, the electric furnace of this invention comprises four equal lengths and heights sidewalls and a bottom to form a square boxshaped container or cavity for melting thermoplastic, such as glass, the open top of which is covered with a layer of glass sand and cullet to be melted, which layer acts as the insulation cover for the molten glass in the furnace. The outlet from the furnace comprises a trough and duct under the center of one of the sidewalls. This trough duct may have an electrode at each end thereof to prevent solidification or plugging of the outlet when the furnace is not operating and/or is to be drained of the molten glass therein.

The electrodes for this furnace, as distinguished from those in the Gell et al U.S. Pat. No. 3,440,321 mentioned above, extend horizontally through the sidewalls of the furnace in the corner area thereof instead of vertically upwardly through the bottom near the corners. Applicants have discovered that high efficiency and uniform current density also can be obtained in this square furnace by the proper location and mounting of sidewall horizontally extending rod electrodes, as well as with the vertical rod electrodes previously employed. First of all, these horizontal electrodes must be located in the corner areas or near the end of each wall, and preferably one at least in each adjacent wall spaced equally from the corner, all of which electrodes are located in a common horizontal plane, or equally spaced horizontal planes, depending upon the height of the walls of the furnace. In the deeper furnaces with higher side walls, the rod electrodes in each horizontal plane are also in symmetrical vertical planes. The equally spaced horizontal planes are spaced closer together than the spacing of the top electrode from the bottom of glass sand on top of the melt, and than the spacing of the lower electrodes from the bottom of the furnace.

Another important feature of this invention is that the bases of each of the electrodes are spaced inwardly from the normal inner surface of the sidewalls of the furnace, thus each of the electrodes are surrounded by an insulation block of the same type or preferably more durable and heat-resistant refractory than the sidewalls of the furnace so that the current density at the base of the electrodes will be spaced from the normal sidewalls of the furnace, equally for all of the electrodes.

If desired, in order that the distances from base of each rod electrode adjacent the wall of the furnace and outer end of each electrode extending into the furnace are substantially equal or approach equality for the electrodes in the diagonally opposite corners, instead of projecting perpendicularly to the sidewalls, they may be placed at an angle of less than about 20° toward their corners. Thus the distance which is added between the outer ends of diagonally opposite electrodes approaches the distance between their bases; however, the distances between the tops and bottoms of those electrodes along the same side wall of the furnace are made unequal. Accordingly, there is optimum as to where the distances between the tops and bottoms of the electrodes around the furnaces are as substantially equal as possible to insure the most uniform low current distribution along each electrode between the diagonally spaced and same side wall spaced electrodes.

It has been found that the portion of the sidewalls of the furnace adjacent to the electrodes but on the other side of the electrodes from the corners of the furnace is relatively hotter than the other portions of the sidewalls. Thus the normal insulation which is provided around most of the sidewalls of the furnace is replaced at these hotter portions by fluid cooling means such as air blasts.

Last, but not least, it is important that the particular symmetrical furnace of this invention is heated by a two-phase current which phases are 90° apart, and that the two different phases are connected to the two diagonals of electrodes in the furnace, so that all of the corner area electrodes adjacent and along one diagonal of the furnace are connected to one phase and all of the corner area electrodes along the other diagonal of the furnace are connected to the other phase. This two-phase current is easily produced by a Scott connection to star type of transformer of a normal three-phase current power supply.

OBJECTS AND ADVANTAGES

Accordingly, it is an object and purpose of this present invention to produce an effective, efficient and reliable electric glass furnace having sidewall electrodes which has an excellent electrical symmetry, that is, that each electrode sees the same or nearly the same resistance, physical, and electrical geometry which results in a uniform current distribution to the electrode and a low current density throughout the furnace.

Another object is to produce such a high efficiency square electrical furnace for melting plastics such as glass and the like, in which the electrodes are mounted on insulation blocks that extend inwardly from the sidwalls of the furnace which reduces the wear and erosion of these walls, as well as of the electrodes.

BRIEF DESCRIPTION OF THE VIEWS

The above mentioned and other features, objects and advantages, and a manner of attaining them are described more specifically below by reference to embodiments of this invention shown in the accompanying drawings, wherein:

FIG. I is a schematic plan view of a square furnace having bottom electrodes similar to that disclosed in the Gell et al prior art patent, showing in dash lines the current flow between the corner vertical electrodes;

FIG. II is a view taken along line II—II of FIG. I showing the uniform current flow in dash lines between the top and bottom of the corner vertical electrodes;

FIG. III is a schematic view similar to FIG. II showing two sidewall electrodes and in dash lines the concentration of the current flow at the ends of sidewall electrodes employed in prior art furnaces;

FIG. IV is a schematic plan view of a square electric furnace according to one embodiment of this invention showing the Scott connection for the two-phase current connected to the diagonally opposite corner area electrodes in the sidewalls of the furnace;

FIG. V is a schematic sectional view taken along line V—V of FIG. IV showing a plurality of orthogonal rod electrodes in spaced horizontal planes adjacent the corners of the furnace;

FIG. VI is a schematic plan view similar to that of FIG. IV of another embodiment showing the electrodes in the corner areas at an angle α toward their corner;

FIG. VII is an enlarged plan view with parts broken away of a corner of a furnace according to the embodiment shown in FIG. IV; and FIG. VIII is an enlarged sectional view taken along VIII—VIII of FIG. VII showing the location of and connections for the sidewall electrodes.

DETAILED DESCRIPTION OF PREFERRED EMBODIMENTS

Prior Art

FIGS. I and II show a square furnace 10 similar to that disclosed in the above mentioned Gell et al patent, having equal length vertical sidewalls and a bottom forming a square open-top box type receptacle with four equally spaced electrodes 11, 12, 13 and 14 extending vertically up through the bottom 15 adjacent each of the corners of the furnace 10. The dash lines between adjacent and diagonally opposite electrodes in FIG. I show the flow lines of approximately equal current density between these electrodes connected to a two-phase circuit as described in the Gell et al patent. FIG. II shows how evenly this current density is uniformly distributed between the top and bottom of the furnace and along the length of the electrodes 13 and 14.

Sidewall electrodes normally employed in the prior art in rectangular or square-shaped furnace 10 are disclosed schematically in FIG. III wherein the dash lines of equal current flow and density between the sidewall electrodes 16 and 17 on opposite sides of the furnace 10, which electrodes 16 and 17 do not have as uniform a current distribution or density throughout the lengths or through the melt in the furnace, as that for the vertical electrodes shown in FIGS. I and II.

The Electrical Connection

Referring now to FIGS. IV and V there is shown a plan schematic and side view similar to FIGS. I and II, respectively, of a square electric furnace 50 having at least two horizontal sidewall electrodes 21-22, 23-24, 25-26, and 27-28 at each corner thereof. The electrodes along the two diagonals are connected to the two phases, 90° apart produced according to a Scott connection of a three-phase "Y"-type power input transformer 20. It is essential that all of the rod electrodes at diametrically opposite corners, whether in the same plane or in parallel equally spaced horizontal planes as shown in FIG. V, are connected together to opposite ends of the same transformer coil 31 for the electrodes 21-22 and 25-26 via conductors 32 and 36 respectivley. Similarly, the opposite diagonal of electrodes 23-24 and 27-28 are connected to opposite ends of the same transformer winding 33 of the transformer 20 via conductors 34 and 38, respectively. Thus, the current in all the electrodes at opposite corners of the square furnace 40 must and are always 90° out of phase with the current in the other electrodes in the opposite diagonal corners of the furnace 40.

The Rod Electrodes

The sidewall electrodes 21-22, 23-24, 25-26, and 27-28 extend perpendicularly inwardly equal distances from the ends of each of the sidewalls and extend in equal distances from the sidewalls. The length of these electrodes exposed in the furnace, however, is slightly less than their distances from the corners, so that their inner ends do not contact each other. For example, in a furnace having 25' inside dimension can support rod electrodes of about 3' length inside the furnace which are spaced say 4' from the inner corners. All of the electrodes 21 through 28 shown in FIG. IV are in the same horizontal plane and are spaced intermediate the top and bottom of the sidewalls as shown in FIG. V. If the furnace has a height or depth greater than a couple feet in the above example, a vertical array of electrodes equally spaced such as electrodes 21, 21a, 21b, 22, 22a, 22b, 23, 23a, 23b, 24, 24a and 24b shown in FIG. V, may be provided to accomplish a uniform current density, electrical geometry and resistance between the electrodes throughout the height or depth and breadth of the square furnace.

In order that the geometric and physical distance between the base and the outer end of the electrodes in diametrically opposite corners could be more nearly equal, the electrodes 41 through 48 as shown in FIG. VI (corresponding to the electrodes 21 through 28 in FIG. IV) may be placed at an angle α to the perpendicular to their respective walls, which angle is less than about 20° and preferably between about 15° and 20°. By attempting then to equalize more the distance along one diagonal between the tips and bases for electrodes 41 and 46, for example, correspondingly the distances between the tips and bases of adjacent electrodes 41 and 48 on the same sidewall 54 is made less equal. Thus there is an optimum involved for this angle α for making uniform current density throughout the length of each of the electrodes 41 through 48. Here again, all of the electrodes at diagonally opposite corners are connected to the same coil of the transformer 20, as illustrated in FIG. IV and as described in the above mentioned Gell et al patent.

The rod type of electrode may be made of molybdenum and made in cylindrical sections which may be screwed together so that as the electrodes erode or wear off in the molten glass in the furnace, their length can be increased by screwing another section onto the section outside the furnace and feeding it into the furnace. This is also disclosed for the bottom electrode in the above mentioned Gell et al patent. However, the rate of erosion of the sidewall electrodes of this invetion, although different from that of the vertical bottom electrodes of Gell et al patent, is much less and more uniform than those of the prior art shown in FIG. III.

The Furnace

Referring now to FIGS. IV through VIII, the structure of the square furnace 50 comprises vertical equal lengths and equal heights sidewalls 51, 52, 53 and 54 forming a square enclosure and having a bottom 55. Along the center of one of the walls namely, wall 53 herein, there is provided an outlet trough 56 that connects with an outlet duct 57 outside of the wall 53. This outlet duct and trough 56 and 57 may be provided with vertical bottom electrodes 58 and 59, respectivey, at the inner and outer ends. These electrodes 58 and 59 are connected to an entirely separate circuit than that shown in FIG. IV, and they are provided primarily to prevent the molten glass or other plastic from solidifying in the outlet during the draining of the furnance after the sidewall electrodes 21-28 have been turned off.

An important feature for the mounting of the electrodes 21-28 or 41-48 according to this invention is that their exposed bases are spaced inwardly from the inner sidewalls of the furnace by refractory blocks such as the vertically elongated block 60 (see FIGS. IV through VIII) into which blocks 60 are formed enlarged holes 61 for each of the vertically aligned electrodes as shown for the electrodes 27, 27a and 27b in FIG. VIII. These blocks 60 are thicker than the correspondingly adjacent blocks forming the sidewalls 51, 52, 53 or 54 of the furnace 50, extending inwardly of inner surface of these walls a sufficient distance so that the current flow to the base of these electrodes 21-28 and 41-48 is spaced away from the walls to reduce the heat and erosion of the walls. The enlarged holes 61 in blocks 60 for the electrodes are for jackets 63 of cooling fluid or water which is introduced via manifold duct 62 into the tubular jackets 63 around the electrodes adjacent the outside surface of the blocks 60. The other connections to the outer ends of the electrodes 27, 27a, 27b and 28, 28a, 28b shown in FIGS. VII and VIII is to the electrical conductor 38 to the transformer coil winding 33 shown in FIG. IV.

Adjacent to the outside surface of the walls 51 through 54, and specifically as shown for the walls 53 and 54 in FIG. VII, there is usually provided a layer of insulation material 70 to reduce the escape of heat from walls of the furnace. However, it has been found that adjacent the electrodes on their side facing the opposite phase electrodes, namely along the same sidewall, that this wall becomes more heated. In order to prevent excessive erosion thereof due to such heat, the walls are externally cooled by a fluid such as air from blower 80 shown in FIG. VII. Thus the insulation layer 70 has been removed from these portions of the walls adjacent the electrodes. It is to be understood, however, that other means of cooling these portions of the walls adjacent the electrodes may be provided such as cooling coils, heat exchange plates, or other fluid conductors, as desired.

While there is described above the principles of this invention in connection with specific apparatus, it is to be clearly understood that this description is made only by way of example and not as a limitation of the scope of this invetion.

What is claimed is:

1. A square electric furnace for melting a thermoplastic material such as glass, said furnace comprising:
    (A) four vertical equal length and height sidewalls and a bottom,
    (B) at least two vertically spaced similar rod electrodes projecting horizontally inwardly near and at the same distance from each end of each wall, which electrodes are in at least two parallel horizontal planes spaced more from the top and bottom of said furnace than they are apart,
    (C) a two-phase electric current, one phase being 90° out of phase with the other phase, said one phase being connected to all the electrodes at one pair of diagonally opposite corners, and the other phase being connected to all the electrodes at the other pair of diagonally opposite corners of said furnace, and
    (D) vertically extending refractory blocks projecting inwardly from the inside surface of said sidewalls throughout the height of said furnace at each vertically spaced group of electrodes, and said electrodes projecting through said blocks.

2. A furnace according to claim 1 wherein the electrodes at each corner area project inwardly and toward their corner at an angle less than about 20° with the perpendicular to their walls.

3. A furnace according to claim 1 including a heat insulation layer on the outside of said walls, except on portions of said walls adjacent said electrodes away from said corners.

4. A furnace according to claim 3 including means for fluid cooling said portions of said outside walls not having said insulation layer.

5. A furnace according to claim 1 including a trough outlet under the center of one of said walls.

6. A furnace according to claim 5 including an electrode at each end of said trough.

* * * * *

UNITED STATES PATENT AND TRADEMARK OFFICE
CERTIFICATE OF CORRECTION

PATENT NO. : 4,246,433
DATED : January 20, 1981
INVENTOR(S) : George B. SEIFRIED et al It is certified that error appears in the above-identified patent and that said Letters Patent are hereby corrected as shown below:

Item [73] on Title Page, "Assignee" should read - - Jointly, Toledo Engineering Co., Inc., Toledo, Ohio and Elemelt Limited, Staffs, England - -

Signed and Sealed this

Twenty-sixth Day of January 1982

[SEAL]

*Attest:*

*Attesting Officer*

GERALD J. MOSSINGHOFF

*Commissioner of Patents and Trademarks*